(12) United States Patent
Singh et al.

(10) Patent No.: US 12,173,134 B2
(45) Date of Patent: Dec. 24, 2024

(54) RUBBER AND HYDRAULIC HOSE COMPRISING A INNER TUBE MADE OF THE RUBBER MATERIAL

(71) Applicant: Eaton Intelligent Power Limited, Dublin (IE)

(72) Inventors: Dipak Gopal Singh, Pune (IN); Juergen Schmidt, Rastatt (DE)

(73) Assignee: DANFOSS A/S, Nordborg (DK)

( * ) Notice: Subject to any disclaimer, the term of this patent is extended or adjusted under 35 U.S.C. 154(b) by 681 days.

(21) Appl. No.: 17/218,224

(22) Filed: Mar. 31, 2021

(65) Prior Publication Data

US 2021/0214521 A1 Jul. 15, 2021

Related U.S. Application Data

(62) Division of application No. 15/763,847, filed as application No. PCT/EP2016/072574 on Sep. 22, 2016, now abandoned.

(30) Foreign Application Priority Data

Sep. 30, 2015 (IN) .......................... 3143/DEL/2015
Nov. 12, 2015 (GB) .................................... 1519958

(51) Int. Cl.
*C08K 3/22* (2006.01)
*B32B 1/08* (2006.01)
(Continued)

(52) U.S. Cl.
CPC .................. *C08K 3/22* (2013.01); *B32B 1/08* (2013.01); *B32B 5/02* (2013.01); *B32B 15/06* (2013.01);
(Continued)

(58) Field of Classification Search
None
See application file for complete search history.

(56) References Cited

U.S. PATENT DOCUMENTS 3,823,122 A * 7/1974 Mauceri .................... C08K 5/16
524/300
4,606,952 A ‡ 8/1986 Sugimoto ............... B32B 25/14
428/36.8
(Continued)

FOREIGN PATENT DOCUMENTS

CN 103087369 A 5/2013
CN 104072899 A 10/2014
(Continued)

OTHER PUBLICATIONS

Tachibana—JP H05-339426 A—Jap. Rej. D2—IDS—MT—10 parts nitrile-conjug.diene+metal acrylate+peroxide+sulfur—1993 (Year: 1993).*

(Continued)

*Primary Examiner* — John Vincent Lawler
(74) *Attorney, Agent, or Firm* — LEYDIG, VOIT & MAYER LTD.

(57) ABSTRACT

A curing composition for rubber includes: a metallic co-agent selected from the group consisting of zinc diacrylate and zinc methacrylate; organic peroxide; sulfur; and a hydrotalcite compound. The curing composition and a rubber matrix can be used to make an uncured rubber composition. A cured rubber is obtainable by curing the uncured rubber composition.

19 Claims, 4 Drawing Sheets

(51) Int. Cl.
*B32B 5/02* (2006.01)
*B32B 15/06* (2006.01)
*B32B 25/00* (2006.01)
*B32B 25/02* (2006.01)
*B32B 25/10* (2006.01)
*B32B 25/16* (2006.01)
*C08K 3/06* (2006.01)
*C08K 3/26* (2006.01)
*C08K 5/098* (2006.01)
*C08K 5/14* (2006.01)
*C08K 13/02* (2006.01)
*C08L 7/00* (2006.01)
*C08L 9/02* (2006.01)
*C08L 21/00* (2006.01)
*F16L 11/10* (2006.01)

(52) U.S. Cl.
CPC ............ *B32B 25/00* (2013.01); *B32B 25/02* (2013.01); *B32B 25/10* (2013.01); *C08K 3/06* (2013.01); *C08K 3/26* (2013.01); *C08K 5/098* (2013.01); *C08K 5/14* (2013.01); *C08K 13/02* (2013.01); *C08L 7/00* (2013.01); *C08L 9/02* (2013.01); *C08L 21/00* (2013.01); *F16L 11/10* (2013.01); *B32B 25/16* (2013.01); *B32B 2250/03* (2013.01); *B32B 2255/02* (2013.01); *B32B 2255/205* (2013.01); *B32B 2262/103* (2013.01); *B32B 2264/108* (2013.01); *B32B 2307/306* (2013.01); *B32B 2307/40* (2013.01); *B32B 2307/54* (2013.01); *B32B 2307/554* (2013.01); *B32B 2307/5825* (2013.01); *B32B 2307/714* (2013.01); *B32B 2597/00* (2013.01); *C08K 2003/222* (2013.01); *C08K 2003/2227* (2013.01)

(56) References Cited

U.S. PATENT DOCUMENTS

| | | | | |
|---|---|---|---|---|
| 4,720,526 A * | 1/1988 | Roland | ............... | C08K 5/098 525/274 |
| 4,983,678 A * | 1/1991 | Saito | ............... | C08L 15/005 525/193 |
| 5,208,294 A * | 5/1993 | Brown | ............... | C08L 15/005 525/274 |
| 5,246,994 A ‡ | 9/1993 | Shibahara | ............... | C08F 267/08 524/210 |
| 5,312,869 A * | 5/1994 | Nomura | ............... | C08L 23/16 525/193 |
| 5,830,946 A * | 11/1998 | Ozawa | ............... | C08K 5/098 525/308 |
| 6,120,390 A ‡ | 9/2000 | Dalton | ............... | A63B 37/0003 473/351 |
| 6,279,616 B1 ‡ | 8/2001 | Croft | ............... | B29D 23/00 138/133 |
| 6,397,913 B1 ‡ | 6/2002 | Kanenari | ............... | B60C 1/00 152/517 |
| 6,399,672 B1 ‡ | 6/2002 | Ceska | ............... | C07F 9/091 428/500 |
| 6,458,883 B1 ‡ | 10/2002 | Takashima | ............... | C08K 3/04 252/511 |
| 6,926,038 B1 ‡ | 8/2005 | Cook | ............... | B29C 66/71 138/124 |
| 2002/0033217 A1 ‡ | 3/2002 | Kanenari | ............... | B32B 25/14 152/516 |
| 2004/0099323 A1 ‡ | 5/2004 | Bourgrois | ............... | D04C 1/06 138/127 |
| 2006/0111504 A1 * | 5/2006 | Morioka | ............... | C08L 23/16 524/502 |
| 2006/0287134 A1 ‡ | 12/2006 | Sullivan | ............... | A63B 37/0045 473/371 |
| 2008/0072984 A1 * | 3/2008 | Branch | ............... | D04B 1/225 138/123 |
| 2008/0111113 A1 * | 5/2008 | Mizumoto | ............... | C08K 5/098 521/149 |
| 2009/0142572 A1 ‡ | 6/2009 | Burlett | ............... | B29D 29/08 428/295.1 |
| 2009/0325730 A1 ‡ | 12/2009 | Sullivan | ............... | A63B 37/0003 473/374 |
| 2010/0048803 A1 * | 2/2010 | Tsuneyoshi | ............... | C08F 265/08 525/295 |
| 2010/0104789 A1 * | 4/2010 | Imada | ............... | C08K 3/013 428/36.8 |
| 2010/0330319 A1 * | 12/2010 | Tsukada | ............... | B32B 25/04 524/522 |
| 2011/0160344 A1 ‡ | 6/2011 | Shoji | ............... | C08K 5/39 523/453 |
| 2012/0246799 A1 ‡ | 10/2012 | Khoo | ............... | C08J 5/02 2/168 |
| 2015/0183970 A1 * | 7/2015 | Miyamoto | ............... | B32B 25/16 524/424 |

FOREIGN PATENT DOCUMENTS

| | | | | |
|---|---|---|---|---|
| CN | 104448434 A | | 3/2015 | |
| CN | 104610596 A | | 5/2015 | |
| EP | 0972797 | * | 1/2000 | ............ C08L 15/00 |
| EP | 1160496 A1 | | 12/2001 | |
| EP | 1479721 A1 | | 11/2004 | |
| EP | 1493956 A1 | * | 1/2005 | ............ B32B 1/08 |
| EP | 1801664 A1 | | 6/2007 | |
| EP | 2620273 A1 | | 7/2013 | |
| JP | H05/339426 A | * | 12/1993 | ............ C08K 3/00 |
| JP | 2003221468 A | | 8/2003 | |
| JP | 2008122600 A | | 5/2008 | |
| JP | 2014214188 A | | 11/2014 | |
| WO | WO 2014007220 A1 | | 1/2014 | |

OTHER PUBLICATIONS

J-Flex—NBR Rubber—Oct. 27, 2023 (Year: 2023).*
Besche—EP 1493956 A1—MT—rubber hose w—zinc diacrylate—2005 (Year: 2005).*
Wysocki—reinforcement of EPR & EPDM by zinc dimethacrylate—PhD Akron—2006 (Year: 2006).*

\* cited by examiner
‡ imported from a related application

Compression set test

RUBBER AND HYDRAULIC HOSE COMPRISING A INNER TUBE MADE OF THE RUBBER MATERIAL

CROSS-REFERENCE TO RELATED APPLICATIONS

This application is a Divisional of U.S. patent application Ser. No. 15/763,847, filed Mar. 28, 2018 as the U.S. National Phase application under 35 U.S.C. § 371 of International Application No. PCT/EP2016/072574, filed on Sep. 22, 2016, which claims benefit to Indian Patent Application No. 3143/DEL/2015, filed on Sep. 30, 2015, and British Patent Application No. 1519958.1, filed on Nov. 12, 2015. The disclosures of the '847 application, International Application No. PCT/EP2016/072574, the Indian Patent Application No. 3143/DEL/2015, and the British Patent Application No. 1519958.1 are hereby incorporated by reference herein in their entireties for all purposes.

FIELD

The present patent application relates to a curing composition, an uncured rubber composition comprising the curing composition, a cured rubber obtainable by curing the uncured rubber composition, and a method for curing the uncured rubber composition. Finally, it relates to a hydraulic hose comprising a inner tube made of the cured rubber.

BACKGROUND

A hydraulic hose transfers fluids under pressure from one place to another. In general, hoses are made from one or a combination of many different materials. The material of the hose being used largely depends on the application and the performance needed from the hose. Some of the common materials include nylon, polyurethane, polyethylene, PVC or synthetic or natural rubbers. In order to achieve a better pressure resistance, hoses can be reinforced with fibers or stainless steel wires. Some of the commonly used reinforcement methods include braiding, spiraling, knitting and wrapping. Variations in hose can be due to its size, rated temperature, weight, numbers of reinforcement layers, type of reinforcement layers, rated working pressure, flexibility and economics.

Typically, a hydraulic hose can be described as a composite structure primarily made of alternate layers of rubber and steel. For example, a hose can consist primarily of three layers namely: Tube, Reinforcement and Cover.

Hydraulic hoses are used in a variety of industries like oil and gas drilling, agricultural, construction, mining equipment, heavy-machinery, household appliances, etc. Hydraulic hoses fail due to various factors like pulling, abrasion, twisting of wire layers due to multi plane bending, operating conditions, etc. The operating conditions of the hose determine its service life. For instance, extremes in temperature accelerate aging, frequent and extreme pressure fluctuations accelerate fatigue life of hose.

Uptime/downtime plays, for example, a major role in the mining segment. A typical hose assembly in mining lasts about from 3000 hours until 8000 hours, than the inner tube becomes brittle and does no longer function. That means for the application 1 to 2 years, but with a big variance, meaning the hose could fail sometimes even earlier, meaning down time on an open pit excavator. If an open pit excavator goes down the whole mine stands still.

One approach for enhancing the maximal use time of hoses in the above application fields has been to make the inner layer of hydrogenated nitrile butadiene rubber (HNBR) which has both physical strength and retention of properties after long-term exposure to heat, oil and chemicals.

However, HNBR possesses a high tendency to creep. In addition HNBR is very expensive.

Hence, there is the need to provide improved rubber compositions for hydraulic hose applications.

SUMMARY

In an embodiment, the present invention provides a curing composition for rubber, comprising: a metallic co-agent selected from the group consisting of zinc diacrylate and zinc methacrylate; organic peroxide; sulfur; and a hydrotalcite compound.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

According to a first aspect of the present invention a curing composition for rubber is provided comprising:
  a metallic co-agent selected from the group consisting of zinc diacrylate and zinc methacrylate and mixtures thereof
  an organic peroxide-sulfur
  a hydrotalcite compound.

The above curing composition is a hybrid system comprising the above metallic coagent together with an organic peroxide and sulfur. This combination brings about two different kinds of bonds in the rubber matrix resulting in improved physical characteristics of the cured rubber composition. This allows, for example, to produce a new NBR (Acrylonitrile Butadiene rubber) inner tube which is suitable for a hydraulic hose that has reasonable cost and performs extremely well at high pressure and high temperature condition in impulse tests. The combination of these curing agents in the curing composition according to the present invention gives the optimum properties required for a hydraulic hose in demanding applications.

Figure 1:
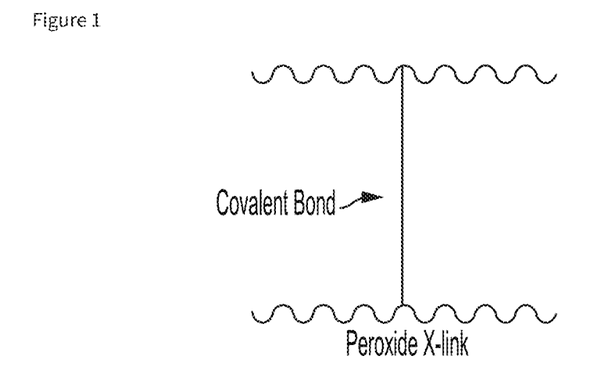
FIG. 1 shows a covalent bond caused by curing with an organic peroxide in rubber.
Figure 2:
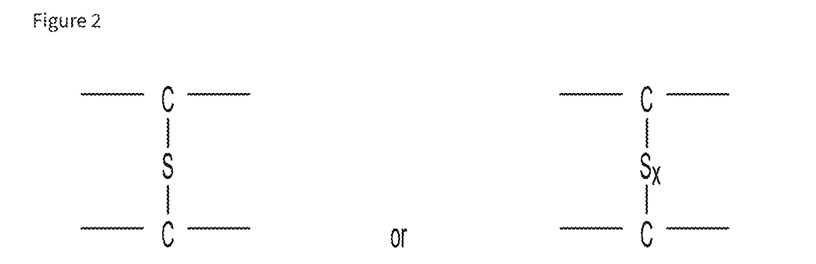
FIG. 2 shows mono- or poly sulfide bonds in rubber.

It is noted that crosslinking with an organic peroxide alone would result in the formation of a covalent bond as shown in FIG. 1. This carbon-carbon bond is quite rigid and stable and accounts for the lower tensile and tear strength of peroxide cured stocks compared with sulfur vulcanizates. The good heat stability of this covalent bond also explains the superior heat aged characteristics of peroxide cured systems. In contrast, (poly) sulfide crosslinks as shown in FIG. 2 formed in sulfur cure are thermally weak but are mobile under stress and can slip along the hydrocarbon chain. This mobility has been used to explain the superior tensile and tear strength in sulfur cured stocks. However, sulfur cured rubber is liable to degrade when exposed to heat.

Figure 3:
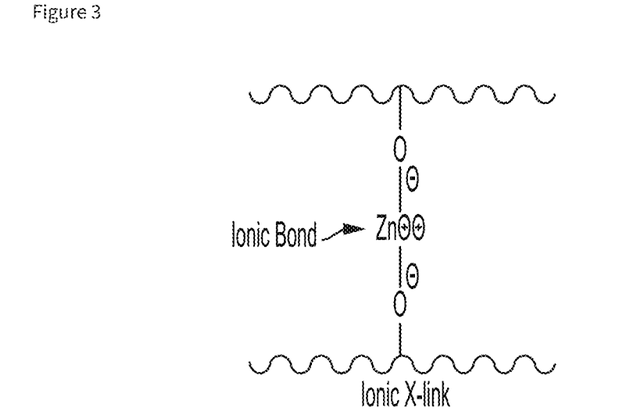
FIG. 3 shows ionic bonds in rubber caused by the combination of metallic coagent with organic peroxide.

In contrast thereto, without being bound to a specific theory, it is believed that the metallic coagent-peroxide crosslink bond is "ionic" as shown in FIG. 3. This ionic bond exhibits both good heat aged stability and the ability to slip along the hydrocarbon chain and reform.

Thus, this system embodies the characteristics of both the peroxide and sulfur crosslink systems, giving high tensile and tear strength and excellent heat aged properties.

Organic peroxides normally used in the rubber or plastic industry may be used as the organic peroxide in the curing composition of the first aspect of the present invention. Generally, the organic peroxide is selected from the group consisting of dicumyl peroxide, di-t-butyl peroxide, t-butyl-cumyl peroxide, cumene hydroperoxide, benzoyl peroxide, 2,4-dichlorobenzoyl peroxide, 2,5-dimethyl-2,5-di(t-butylperoxy)hexyne-3, 1,1-di(t-butylperoxy)-3,3,5-trimethylcyclohexane, t-butyl peroxybenzoate, 2,5-dimethyl-2,5-di(benzoylperoxy)hexane and 1,3-di(t-butylperoxyisopropyl)benzene and mixtures thereof. Preferably dicumyl peroxide, benzoyl peroxide or mixtures thereof are used. Most preferred is dicumyl peroxide because of its reasonable price and availability.

The metallic co-agent is selected from the group consisting of zinc diacrylate and zinc methacrylate and mixtures thereof. These metallic coagents create extremely strong adhesive bonds between a variety of rubbers and untreated metal substrates. The metallic coagents are readily compounded into the rubber stock where they crosslink into the rubber when cured with peroxides. Thus, they function as adhesion promoters as well as crosslinkers to enhance both the adhesive and mechanical properties of the cured rubber. Zinc diacrylate is the best coagent for adhesion, but zinc methacrylate is a good alternative when further improved abrasion resistance and tear strength is needed in addition to adhesion.

The curing composition according to the present invention additionally contains sulfur. By adding sulfur, the tensile and tear strength of the cured rubber is enhanced. In addition, the adhesion with untreated metallic surfaces is improved. Wire adhesion is extremely important as it leads to ease of assembly and many theories also suggest it helps in achieving an effective load transfer when applying impulses. This is especially true for brass coated steel wire. Without being bound to a specific theory, it is believed that the latter technical effect is due to entanglements of sulfur bonds of the cured rubber with a CuS layer formed on top of the brass (CuZn) coated steel. Thus, the cured rubber obtainable by using the curing composition according to the first aspect of the present invention is very suitable for producing hydraulic hoses wherein the innermost layer made of rubber cured by the curing composition according to the first aspect of the present invention directly contacts a reinforcement layer made of brass coated steel. As a result, such a hydraulic hose shows very little creeping and the longevity is enhanced.

Finally, the curing composition according to the first aspect of the present invention comprises also a hydrotalcite compound for irreversible acid scavenging. In its naturally occurring form, hydrotalcite is mined in small quantities in Russia and Norway. Synthetic forms produced in commercial quantities may generally be described by the formula (I)

$$Mg(1-x)Al_x(OH)_2(CO_3)_x/2 \cdot nH_2O; \ 0.25 < x < 0.33. \tag{I}$$

Thus, synthetic hydrotalcite as described by formula (I) may include a mixture of various compounds within the given range of x. Synthetic forms of hydrotalcite are available from several sources, including DHT-4A2® and Alcamizer® from Kyowa Chemical Industry Co., Ltd., Sorbacid® 911 from Sud-Chemie AG, Hycite® 713 from Ciba Specialty Chemicals, and Hysafe® from Huber. Preferably, a dehydrated hydrocalcite compound, such as DHT-4A2-2® from Kyowa, is used due to its enhanced thermal stability.

According to a second aspect of the present invention an uncured rubber composition comprising a rubber matrix and the curing composition as described in the curing composition of the first aspect of the present invention is provided.

In a preferred embodiment of the present invention the rubber matrix is selected from the group consisting of Acrylo nitrile butadiene rubber, hydrogenated nitrile butadiene rubber, chlorosulphonated polyethylene, styrene-butadiene rubber, or mixtures thereof. Preferably, the matrix comprises Acrylonitrile butadiene rubber. Acrylonitrile butadiene rubber (NBR) is a family of unsaturated copolymers of 2-propenenitrile and various butadiene monomers (1,2-butadiene and 1,3-butadiene). Although its physical and chemical properties vary depending on the polymer's composition of nitrile, this form of synthetic rubber is unusual in being generally resistant to oil, fuel, and other chemicals (the more nitrile within the polymer, the higher the resistance to oils but the lower the flexibility of the material). More preferably, the Acrylonitrile butadiene rubber is blended with a rubber selected from the group consisting of chlorosulphonated polyethylene, styrene-butadiene rubber, hydrogenated nitrile and mixtures thereof.

Preferably, the uncured rubber composition according to the second aspect of the present invention comprises 2 to 15 parts of metallic co-agent per hundred parts of rubber.

Preferably, the uncured rubber composition according to the second aspect of the present invention comprises 2 to 15 parts of organic peroxide per hundred parts of rubber.

Preferably, the uncured rubber composition according to the second aspect of the present invention comprises 0.5 to 2.0 parts sulfur per hundred parts of rubber.

Preferably, the uncured rubber composition according to the second aspect of the present invention comprises 2 to 20 parts hydrocalcite compound per hundred parts of rubber.

Preferably, the uncured rubber composition according to the second aspect of the present invention comprises 5 to 20 parts hydrogenated nitrile butadiene rubber per hundred parts of rubber The uncured rubber composition according to the second aspect of the present invention preferably comprises an antiozonant. As antiozonant any compound with the ability to decompose ozone on its surface into oxygen may be used. For example, alumina effectively functions as an antiozonant for polymers such as rubbers. This is called catalytic decomposition of ozone, and this reaction generally occurs at temperatures lower than that of thermal decomposition. Thus, by using an antiozonent, the generation and growth of cracks and rubber chipping resulting from ozone deterioration can be suppressed.

The uncured rubber composition according to the second aspect of the present invention preferably comprises an antioxidant. Examples of the antioxidant include, but are not limited to, amine derivatives such as diphenylamine antioxidants, p-phenylenediamine antioxidants, and naphthylamine antioxidants; quinoline derivatives; hydroquinone derivatives; phenols (monophenols, bisphenols, trisphenols, hindered phenols, polyphenols, thiobisphenols); benzimidazoles; thioureas; phosphites; and organic thioates.

Examples of the diphenylamine antioxidants include p-isopropoxydiphenylamine, p-(p-toluenesulfonyl amide) diphenylamine, N,N-diphenylethylenediamine, and octylated diphenylamine.

Examples of the p-phenylenediamine antioxidants include: N-(1,3-dimethylbutyl)-N'-phenyl-p-phenylenediamine, N-isopropyl-N'-phenyl-p-phenylenediamine, N,N'-diphenyl-p-phenylenediamine, N,N'-di-2-naphthyl-p-phenylenediamine, N-cyclohexyl-N'-phenyl-p-phenylenediamine, N,N'-bis(1-methylheptyl)-p-phenylenediamine, N,N'-bis(1,4-dimethylpentyl)-p-phenylenediamine, N,N'-bis(1-ethyl-3-methylpentyl)-p-phenylenediamine, N-4-methyl-2-pentyl-N'-phenyl-p-phenylenediamine, N,N'-diaryl-p-phenylenediamines, hindered diaryl-p-phenylenediamines, phenyl-hexyl-p-phenylenediamine, and phenyl-octyl-p-phenylenediamine.

Examples of the naphthylamine antioxidants include phenyl-a-naphthylamine, phenyl-p-naphthylamine, and aldol-a-trimethyl 1,2-naphthylamine.

Examples of the quinoline antioxidants (quinoline derivatives) include 2,2,4-trimethyl-1,2-dihydroquinoline polymer and 6-ethoxy-2,2,4-trimethyl-1,2-dihydroquinoline.

Examples of the hydroquinone antioxidants (hydroquinone derivatives) include 2,5-di-(tert-amyl) hydroquinone and 2,5-di-tert-butylhydroquinone.

As for the phenol antioxidants (phenols), examples of the monophenol antioxidants include 2,6-di-tert-butyl-4-methylphenol, 2,6-di-tert-butyl-4-ethylphenol, 2,6-di-tert-butylphenol, 1-oxy-3-methyl-4-isopropylbenzene, butylated hydroxyanisole, 2,4-dimethyl-6-tert-butylphenol, n-octadecyl-3-(4'-hydroxy-3',5'-di-tert-butylphenyl) propionate, and styrenated phenol. Examples of the bisphenol, trisphenol, and polyphenol antioxidants include 2,2'-methylene-bis(4-methyl-6-tert-butylphenol), 2,2'-methylene-bis(4-ethyl-6-tert-butylphenol), 4,4'-butylidene-bis(3-methyl-6-tert-butylphenol), 1,1'-bis(4-hydroxyphenyl)-cyclohexane, and tetrakis[methylene-3-(3',5'-di-tert-butyl-4'-hydroxyphenyl) propionate]methane. Examples of the thiobisphenol antioxidants include 4,4'-thiobis-(6-tert-butyl-3-methylphenol), and 2,2'-thiobis-(6-tert-butyl-4-methylphenol).

Examples of the benzimidazole antioxidants (benzimidazoles) include 2-mercaptomethyl benzimidazole. Examples of the thiourea antioxidants (thioureas) include tributylthiourea. Examples of the phosphite antioxidants (phosphites) include tris(nonylphenyl)phosphite. Examples of the organic thioate antioxidants (organic thioates) include dilauryl thiodipropionate.

Among these, in terms of remarkably improving ozone resistance, p-phenylenediamine antioxidants are preferred, and N-(1,3-dimethylbutyl)-N'-phenyl-p-phenylenediamine is more preferred.

In the uncured rubber composition according to the second aspect of the present invention, the total combined amount of the antiozonant for polymers and the antioxidant to be added per 100 parts by mass of the rubber component is preferably 1.5 parts by mass or more, and more preferably 2.2 parts by mass or more. If the total combined amount is less than 1.5 parts by mass, the effect of preventing ozone deterioration may not be obtained sufficiently. Also, the total combined amount is preferably 25 parts by mass or less, and more preferably 23 parts by mass or less. If the total combined amount is more than 25 parts by mass, the tensile parameters may be reduced and brown discoloration may be caused.

The uncured rubber composition according to the second aspect of the present invention preferably includes wax leading to an improvement in ozone resistance.

Examples of the wax include petroleum wax such as paraffin wax, and vegetable wax such as carnauba wax, rice wax, candelilla wax, japan wax, urushi wax, sugar cane wax, and palm wax. Among these, petroleum wax is preferred and paraffin wax is more preferred, because they provide excellent ozone resistance.

The amount of wax to be added per 100 parts by mass of the rubber component is preferably 0.1 parts by mass or more, and more preferably 0.5 parts by mass or more. If the amount is less than 0.1 parts by mass, an effective film may not be formed therefrom. The amount is preferably 5 parts by mass or less, and more preferably 3 parts by mass or less. If the amount is more than 5 parts by mass, discoloration on the rubber surface may not be sufficiently suppressed.

The uncured rubber composition according to the second aspect of the present invention preferably includes zinc oxide. Zinc oxide effectively functions as an accelerator for the ozone decomposition reaction of the antiozonant. The zinc oxide is not particularly limited and may be one commonly used in the rubber industry.

The amount of zinc oxide to be added per 100 parts by mass of the rubber component is preferably 1 part by mass or more, and more preferably 2 parts by mass or more. If the amount is less than 1 part by mass, then zinc oxide may not sufficiently function as the accelerator for the ozone decomposition. The amount is preferably 10 parts by mass or less, and more preferably 5 parts by mass or less. If the amount is more than 10 parts by mass, then zinc oxide is less likely to disperse and the breaking energy may be reduced.

The ozone resistant rubber composition of the present invention preferably includes a filler such as carbon black or titane dioxide leading to an improvement in rubber strength.

The amount of filler to be added per 100 parts by mass of the rubber component is preferably 10 parts by mass or more, and more preferably 30 parts by mass or more. If the amount is less than 10 parts by mass, the breaking energy and grip performance tend to be reduced. The amount of filler is preferably 100 parts by mass or less, and more preferably 70 parts by mass or less. If the amount is more than 100 parts by mass, the dispersibility tends to be reduced.

In addition to the above ingredients, the uncured rubber composition according to the second aspect of the present invention may appropriately contain a compounding agent commonly used in the preparation of a rubber composition, such as silica, a silane coupling agent, oil, stearic acid, and a vulcanization accelerator.

According to the third aspect of the present invention a cured rubber obtainable by curing the uncured rubber composition as described in the second aspect of the present invention is provided. Generally, the uncured rubber composition is cured by applying heat. The curing can be performed by known methods, and is not particularly limited. For example, the curing can be performed by blending the uncured rubber composition, zinc oxide as a curing agent, carbon black as a reinforcement, a curing accelerator, etc. together, forming the resultant composition into a sheet or any other desired shape, and carrying out a press molding thereof. The heating conditions for curing reaction are not particularly limited, and, for example, the curing can be effected at a temperature for 130 to 210° C. for a period for about 5 to 60 min.

According to the fourth aspect of the present invention a hydraulic hose comprising a tube made of the cured rubber as described in the third aspect of the present invention is provided.

Generally, the hydraulic hose comprises three layers: the innermost layer or tube, the reinforcement layer, and the cover layer. Reinforcement allows the hose to handle fluid pressures and pressure spikes, and prevents premature hose bursts when properly used. It determines the working pressure of the hose. Hoses with low working pressures normally use textile-fiber reinforcement, while those handling higher pressures generally use high-strength steel wire.

Steel-reinforced hoses, in turn, fall into two categories: braid and spiral. Wire-braided hose handles working pressures to 6,000 psi, depending on size, with one or two braid layers. Spiral hose, which generally handles high pressures in larger diameters, has wire spiraled around the tube on a bias, with successive layers laid at opposing angles. There are typically four or six layers of steel reinforcement. In braid and spiral hose, rubber layers separate layers of steel wrap to ensure good adhesion throughout the hose wall.

The cover protects the tube and reinforcement from heat, abrasion, and corrosion, as well as environmental deterioration from heat, cold, UV light, and ozone. Covers are made from synthetic rubber, fiber braids, or a fabric wrap, depending on the application.

Preferably, the hydraulic hose comprises an innermost layer made of the cured rubber and a reinforcement layer. The reinforcement layer preferably comprises or consists of metal, preferably steel. More preferably, the reinforcement layer comprises spiral or braided steel wire. It is particularly preferred to use brass coated steel in order to enhance the adhesion with the innermost rubber layer.

According to a fifth aspect of the present invention a method for producing a cured rubber is provided, comprising:

providing an uncured rubber composition as described in the second aspect of the present invention heat treating the uncured rubber composition.

In the following, the present invention will be demonstrated based on a working example and comparative examples.

Working Example (Sample 31449)

A rubber composition was made as follows:

31449 is the sample code for the new inner tube and its composition is based primary on NBR matrix and the new hybrid curing as described in the claim section.

The 31449 is mix in internal mixture and then is used in extruder to form the tube. Extrusion is a process used to create objects of a fixed cross-sectional profile. A material is pushed through a die of the desired cross-section. For making the tube of hydraulic hose in extrusion process a continuous cylindrical tube is extruded. This tube is used to make braided or spiral hose.

Comparative Example 1 (K4890)

K4890 which is efficient sulfur cure system was taken as comparative example 1

Comparative Example 2 (AS2831)

AS2831 which is conventional sulfur cure system was taken as comparative example Comparative Example 3 (ML3792-1)

ML3792-1 which is similar to 31449 but without sulfur.

Tensile Test and Elongation at Break Test

Figure 4:
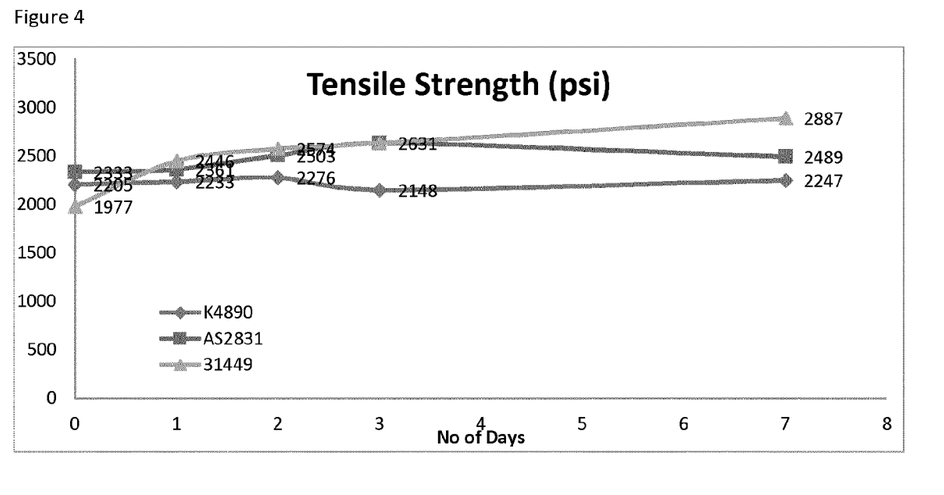
FIGS. 4 and 5 show the tensile strength and elongation at break tests of a tube made of the inventive rubber composition versus two tubes made of rubber of different market compositions after heating at 121° C. in air.
Figure 5:
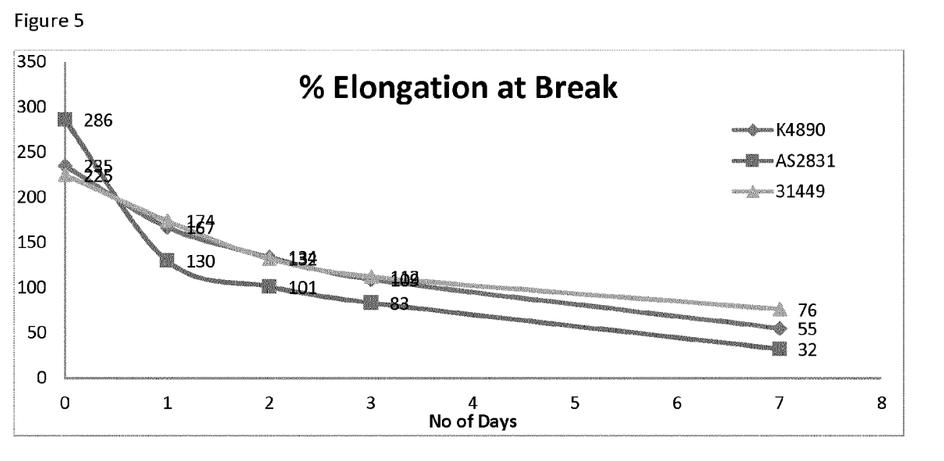
Figure 6:
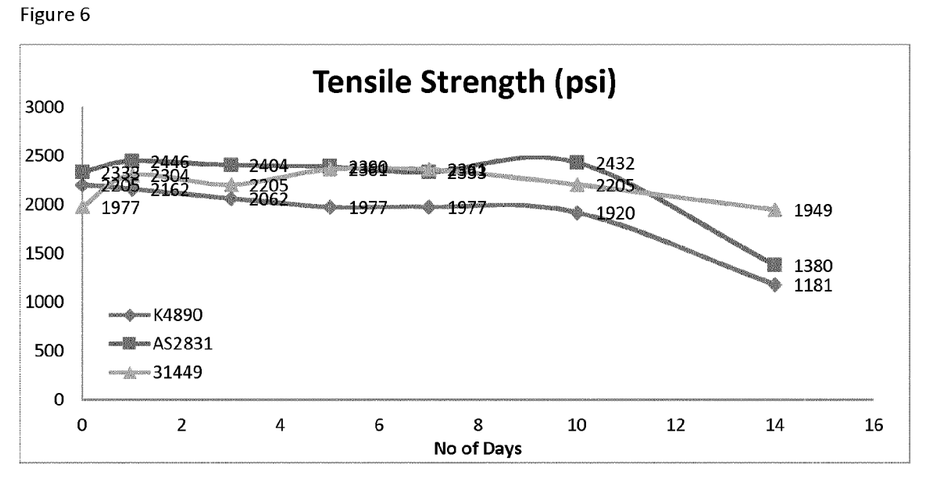
FIGS. 6 and 7 show the tensile strength and elongation at break tests of a tube made of the inventive rubber composition versus two tubes made of rubber of different market compositions after heating at 121° C. in oil.
Figure 7:
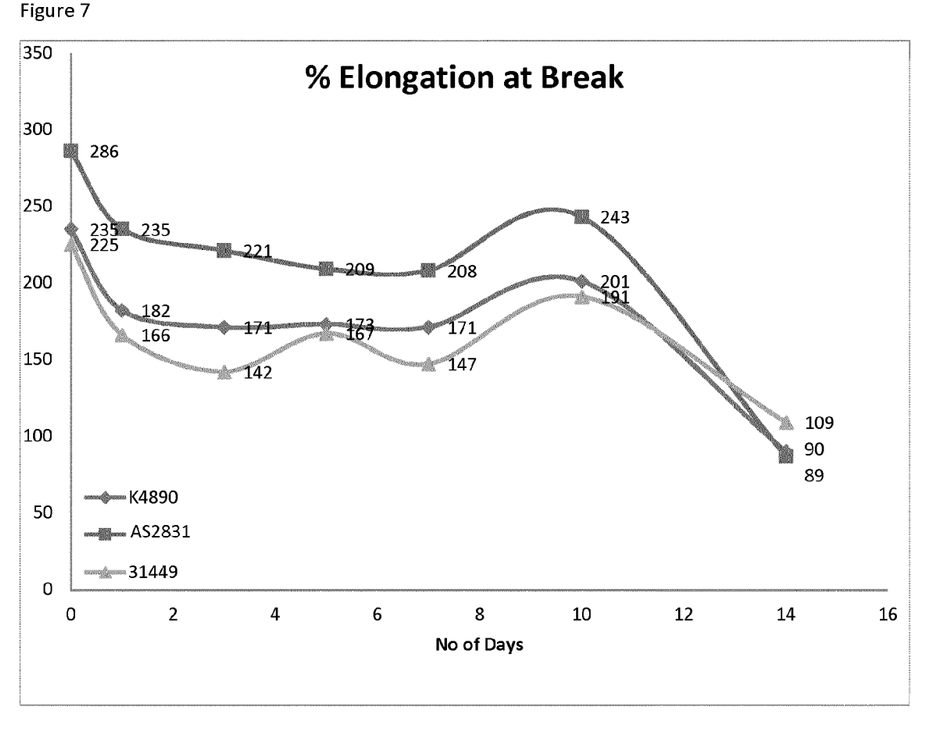

Time dependent tensile & elongation change was performed on the cured rubber (1) 31449 (2) K4890 and (3) AS2831 in Hot air and IRM903 oil at 121° C. For both Hot air and IRM903 the 31449 sample showed lesser drop in tensile and elongation compared to K4890 and AS2831. The test were performed as per ASTM D573 (Standard Test Method for Rubber—Deterioration in an Air Oven) and ASTM D471 (Standard Test Method for Rubber Property—Effect of Liquids). Please refer to the FIGS. 4-7. FIGS. 4 & 5 shows the tensile and elongation change of cured rubber compounds at 121° C. in Hot air and FIGS. 6-7 shows the tensile and elongation change of cured rubber compounds at 121° C. in IRM903 oil.

Compression Set Test

Figure 8:
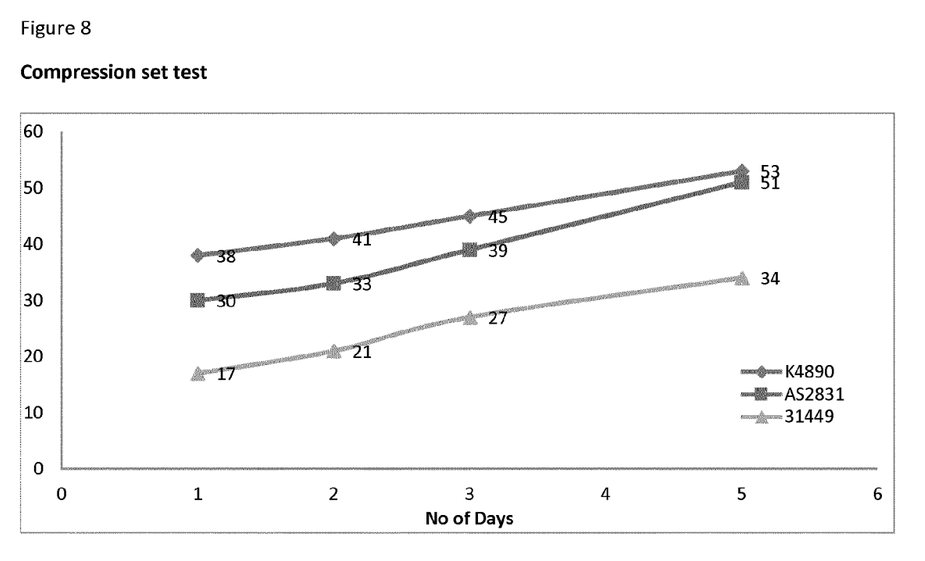
FIG. 8 show the compression set of a tube made of the inventive rubber composition versus two tubes made of rubber of different market compositions after heating at 100° C. in air.

Time dependent compression set was performed on the cured rubber (1) 31449 (2) K4890 and (3) AS2831 at 100° C. as per ASTM D 395 (Standard Test Methods for Rubber Property—Compression Set). The 31449 sample showed lesser set. Please refer to FIG. 8.

Wire Adhesion Test

Comparative rubber to brass coated steel wire adhesion was performed on the cured rubber (1) 31449 and (2) ML3792-1 as per ASTM D 1871 (Standard Test Method for Adhesion Between Tire Bead Wire and Rubber). 31449 adhesion showed much high adhesion at 87 lbf where the ML3792-1 was at 7.9 lbf.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A cured rubber composition, comprising:
 a cured rubber matrix containing molecular chains of rubber and covalent carbon-carbon bonds that interconnect the molecular chains:
 sulfide or polysulfide bonds that interconnect the molecular chains; and
 ionic bonds that interconnect the molecular chains,
 wherein the rubber is present in an amount of 5 to 20 parts per hundred parts of the cured rubber matrix.

2. The cured rubber composition of claim 1, further comprising an additive or additives selected from a group consisting of: antiozonants, antioxidants, accelerators for the antiozonants, fillers, compounding agents, reinforcements, and combinations thereof.

3. A hydraulic hose, comprising:
 a tube composed of layers, the tube comprising the cured rubber composition of claim 2 and a reinforcement layer.

4. The hydraulic hose of claim 3, wherein the reinforcement layer comprises brass-coated steel which directly contacts an innermost layer of the hydraulic hose.

5. The hydraulic hose of claim 3, wherein the reinforcement layer comprises spiral or braid wire reinforcements.

6. The cured rubber composition of claim 2, wherein the additive comprises an antioxidant.

7. The cured rubber composition of claim 1, wherein the rubber of the cured rubber matrix is selected from a group consisting of: acrylonitrile butadiene rubber, hydrogenated nitrile butadiene rubber, chlorosulphonated polyethylene, styrene-butadiene rubber, and mixtures thereof.

8. The cured rubber composition of claim 7, wherein the rubber comprises hydrogenated nitrile butadiene rubber.

9. A method of preparing the cured rubber composition of claim 1, the method comprising:
 (i) providing a composition comprising an uncured rubber: the metallic co-agent;
  an organic peroxide: sulfur; and a hydrotalcite compound; and
 (ii) heat-treating the composition.

10. The method of claim 9, wherein the uncured rubber is selected from a group consisting of: acrylonitrile butadiene rubber, hydrogenated nitrile butadiene rubber, chlorosulphonated polyethylene, styrene-butadiene rubber, and mixtures thereof.

11. The method of claim 10, wherein the uncured rubber comprises hydrogenated nitrile butadiene rubber.

12. The method of claim 11, wherein the organic peroxide is provided in an amount of 2 to 15 parts per hundred parts of the uncured rubber.

13. The method of claim 11, wherein the metallic co-agent is provided in an amount of 2 to 15 parts per hundred parts of the uncured rubber.

14. The method of claim 11, wherein the sulfur is provided in an amount of 0.5 to 2.0 parts per hundred parts of the uncured rubber.

15. The method of claim 11, wherein the hydrotalcite compound is provided in an amount of 2 to 20 parts per hundred parts of the uncured rubber.

16. The method of claim 9, wherein the heat-treating is carried out at a temperature of from 130 to 210° C. for a period of from 5 to 60 minutes.

17. A cured rubber composition, comprising:
 a cured rubber matrix containing molecular chains of rubber and covalent carbon-carbon bonds that interconnect the molecular chains;
 sulfide or polysulfide bonds that interconnect the molecular chains;
 ionic bonds that interconnect the molecular chains; and
 a metallic co-agent selected from a group consisting of zinc diacrylate, zinc methacrylate, and a combination thereof,
 wherein the rubber is present in an amount of 5 to 20 parts per hundred parts of the cured rubber matrix.

18. The cured rubber composition of claim 6, wherein the antioxidant comprises a p-phenylamine antioxidant.

19. The cured rubber composition of claim 18, wherein the p-phenylamine antioxidant comprises N-(1,3-dimethylbutyl)-N'-phenyl-p-phenylenediamine.

* * * * *